US009436697B1

(12) United States Patent
Kulkarni et al.

(10) Patent No.: US 9,436,697 B1
(45) Date of Patent: Sep. 6, 2016

(54) TECHNIQUES FOR MANAGING DEDUPLICATION OF DATA

(71) Applicant: Veritas Technologies LLC, Mountain View, CA (US)

(72) Inventors: Pradip Madhukar Kulkarni, Pune (IN); Vishal Bajpai, Rahatani (IN)

(73) Assignee: Veritas Technologies LLC, Mountain View, CA (US)

( * ) Notice: Subject to any disclaimer, the term of this patent is extended or adjusted under 35 U.S.C. 154(b) by 40 days.

(21) Appl. No.: 13/736,510

(22) Filed: Jan. 8, 2013

(51) Int. Cl.
*G06F 7/00* (2006.01)
*G06F 17/00* (2006.01)
*G06F 17/30* (2006.01)

(52) U.S. Cl.
CPC .............................. *G06F 17/30156* (2013.01)

(58) Field of Classification Search
CPC ... G06F 17/00; G06F 3/0641; G06F 11/1453
See application file for complete search history.

(56) References Cited

U.S. PATENT DOCUMENTS

| | | | |
|---|---|---|---|
| 5,845,005 A * | 12/1998 | Setlak et al. ................... | 382/124 |
| 7,093,086 B1 * | 8/2006 | van Rietschote ............. | 711/161 |
| 7,685,459 B1 * | 3/2010 | De Spiegeleer et al. .... | 714/6.12 |
| 7,761,425 B1 * | 7/2010 | Erickson et al. ............. | 707/649 |
| 2003/0039381 A1 * | 2/2003 | Ziesig ................ | G06K 9/00087 382/124 |
| 2003/0217058 A1 * | 11/2003 | Ladan-Mozes et al. .......... | 707/8 |
| 2007/0181672 A1 * | 8/2007 | Sawamura ..................... | 235/380 |
| 2008/0005141 A1 * | 1/2008 | Zheng .................... | G06F 3/0608 |
| 2008/0243769 A1 * | 10/2008 | Arbour et al. ...................... | 707/2 |
| 2009/0216970 A1 * | 8/2009 | Basler et al. ................. | 711/162 |
| 2010/0042790 A1 * | 2/2010 | Mondal ................. | G06F 3/0608 711/161 |
| 2010/0088296 A1 * | 4/2010 | Periyagaram ........... | G06F 3/061 707/705 |
| 2010/0250858 A1 * | 9/2010 | Cremelie et al. ............. | 711/136 |
| 2012/0030477 A1 * | 2/2012 | Lu et al. ........................ | 713/189 |
| 2012/0150823 A1 * | 6/2012 | Tofano .............. | G06F 17/30336 707/692 |
| 2012/0166448 A1 * | 6/2012 | Li et al. ........................ | 707/747 |
| 2012/0209814 A1 * | 8/2012 | Zhang ................. | G06F 11/1458 707/654 |
| 2013/0018855 A1 * | 1/2013 | Eshghi et al. ................. | 707/692 |
| 2013/0097380 A1 * | 4/2013 | Colgrove et al. ............. | 711/118 |
| 2013/0268497 A1 * | 10/2013 | Baldwin et al. ............... | 707/692 |
| 2013/0297569 A1 * | 11/2013 | Hyde et al. .................... | 707/692 |
| 2014/0052699 A1 * | 2/2014 | Harnik et al. ................. | 707/692 |

OTHER PUBLICATIONS

FBBM: A new Backup Method with Data De-duplication Capability, Yang et al, International COnference on Multimedia and Ubiquitous Enginenering, p. 30-35, 2008.*
SHHC: A Scalable Hybrid Hash Cluster for CLoud Backup Services in Data Centers, Xu et al, 31st International COnference on Distributed Computing System Workshops, p. 61-65, 2011.*
Detecting Near-Duplicates for Web Crawling, Manku et al, WW 2007/Track: Data Mining, pp. 141-149, 2007.*
Scalable Document Fingerprinting, Heintze N., USENIX workshop on electronic, 1996.*

* cited by examiner

*Primary Examiner* — Augustine K Obisesan
(74) *Attorney, Agent, or Firm* — Wilmer Cutler Pickering Hale and Dorr LLP (57) ABSTRACT

Techniques for detecting advanced security threats may be realized as a method for detecting a security threat including generating a resource at a client, implementing the resource on the client, monitoring system behavior of the client having the resource implemented thereon, determining whether a security event involving the implemented resource has occurred based on the monitored system behavior, and generating a report when it has been determined that the security event has occurred.

17 Claims, 5 Drawing Sheets

TECHNIQUES FOR MANAGING DEDUPLICATION OF DATA

FIELD OF THE DISCLOSURE

The present disclosure relates generally to high performance deduplication and, more particularly, to techniques for managing deduplication of data.

BACKGROUND OF THE DISCLOSURE

Traditional deduplication systems typically utilize an in-memory hook table and store fingerprints on-disk in batches for comparison when backing up data. However, for large amounts of data, the size of the hook table may become large, the sampling rate of the hook table may be low, the necessary computing resources to perform deduplication may increase, and the deduplication capacity of the system may be reduced. In view of the foregoing, it may be understood that there may be significant problems and shortcomings associated with traditional deduplication technologies.

SUMMARY OF THE DISCLOSURE

Techniques for managing deduplication of data are disclosed. In one particular embodiment, the techniques may be realized as a method for managing deduplication of data comprising the steps of: receiving data to be backed up; separating the data to be backed up into segments; generating a fingerprint for each of the segments; determining whether each of the segments already exists in memory based on its respective fingerprint; and backing up the segments that do not exist in the memory.

In accordance with other aspects of this particular embodiment, the method further comprises storing the generated fingerprints in a buffer.

In accordance with other aspects of this particular embodiment, the method further comprises determining whether the buffer is full and writing the fingerprints in the buffer to the memory when it is determined that the buffer is full.

In accordance with other aspects of this particular embodiment, the method further comprises sampling the fingerprints stored in the buffer and writing the sampled fingerprints to at least one of a plurality of hook tables.

In accordance with other aspects of this particular embodiment, each sampled fingerprint is a hook.

In accordance with other aspects of this particular embodiment, the fingerprints are sampled at a predetermined rate.

In accordance with other aspects of this particular embodiment, the predetermined rate is selected based on a size of the at least one of the plurality of hook tables.

In accordance with other aspects of this particular embodiment, a first plurality of the sampled fingerprints are written to a first hook table and a second plurality of sampled fingerprints are written to a second hook table.

In accordance with other aspects of this particular embodiment, the first hook table is stored at a first computing node and the second hook table is stored at a second computing node different from the first computing node.

In accordance with other aspects of this particular embodiment, the method further comprises determining which of the fingerprints to distribute to each of the plurality of hook tables.

In accordance with other aspects of this particular embodiment, each of the plurality of hook tables is arranged at a separate computing node within a clustered environment.

In accordance with further aspects of this particular embodiment, determining the distribution of the fingerprints to each of the plurality of hook tables is based on a number of the separate computing nodes.

In accordance with additional aspects of this particular embodiment, determining the distribution of the fingerprints to each of the plurality of hook tables is based on a target deduplication capacity.

In accordance with additional aspects of this particular embodiment, determining the distribution of the fingerprints to each of the plurality of hook tables is based on a rate at which the fingerprints are sampled.

In accordance with additional aspects of this particular embodiment, determining the distribution of the fingerprints to each of the plurality of hook tables is based on a size of each of the plurality of hook tables.

In accordance with other aspects of this particular embodiment, the method further comprises receiving a lookup set of fingerprints and comparing the received lookup set of fingerprints to entries of at least one of a plurality of hook tables.

In accordance with additional aspects of this particular embodiment, each of the plurality of hook tables are arranged at different computing nodes and the received lookup set of fingerprints is compared to the entries of the hook table at each computing node sequentially. In another particular embodiment, the techniques may be realized as at least one processor readable non-transitory storage medium storing a computer program of instructions configured to be readable by at least one processor for instructing the at least one processor to execute a computer process for performing a method comprising receiving data to be backed up; separating the data to be backed up into segments; generating a fingerprint for each of the segments; determining whether each of the segments already exists in memory based on its respective fingerprint; and backing up the segments that do not exist in the memory.

In another particular embodiment, the techniques may be realized as a system for managing deduplication of data comprising one or more processors communicatively coupled to a network; wherein the one or more processors are configured to receive data to be backed up, separate the data to be backed up into segments, generate a fingerprint for each of the segments, determine whether each of the segments already exists in memory based on its respective fingerprint, and back up the segments that do not exist in the memory.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

Figure 1:
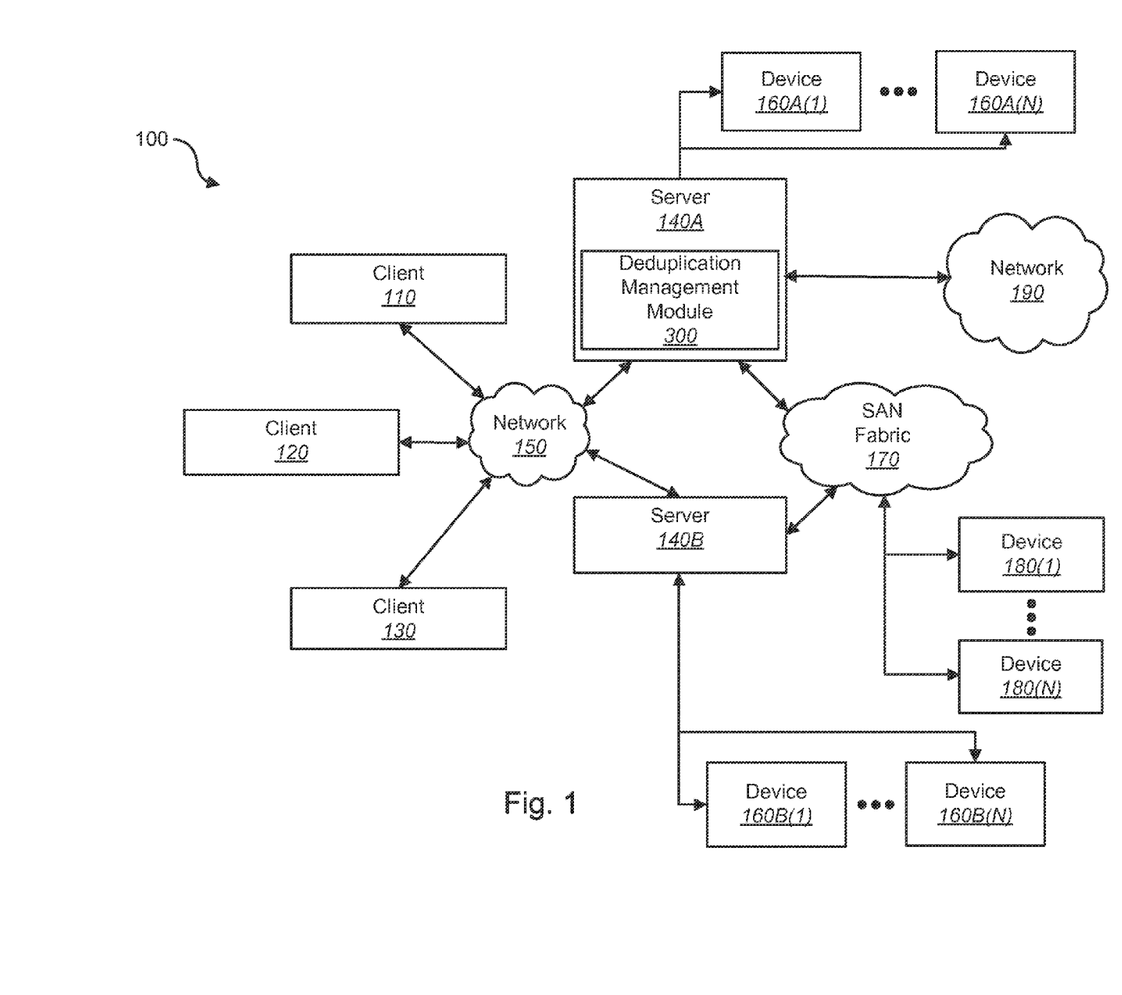
FIG. 1 shows a block diagram depicting a network architecture in accordance with an embodiment of the present disclosure.

FIG. 1 shows a block diagram depicting a network architecture for deduplication management in accordance with an embodiment of the present disclosure.

FIG. 1 is a simplified view of network architecture 100, which may include additional elements that are not depicted. Network architecture 100 may contain client systems 110, 120 and 130, as well as servers 140A-140N (one or more of each of which may be implemented using computer system 200 shown in FIG. 2). Client systems 110, 120 and 130 may be communicatively coupled to a network 150. Server 140A may be communicatively coupled to storage devices 160A(1)-(N), and server 140N may be communicatively coupled to storage devices 160N(1)-(N). Servers 140A-140N may contain a management module (e.g., deduplication management module 300). Servers 140A-140N may be communicatively coupled to a SAN (Storage Area Network) fabric 170. SAN fabric 170 may support access to storage devices 180(1)-(N) by servers 140A-140N, and by client systems 110, 120 and 130 via network 150.

Figure 2:
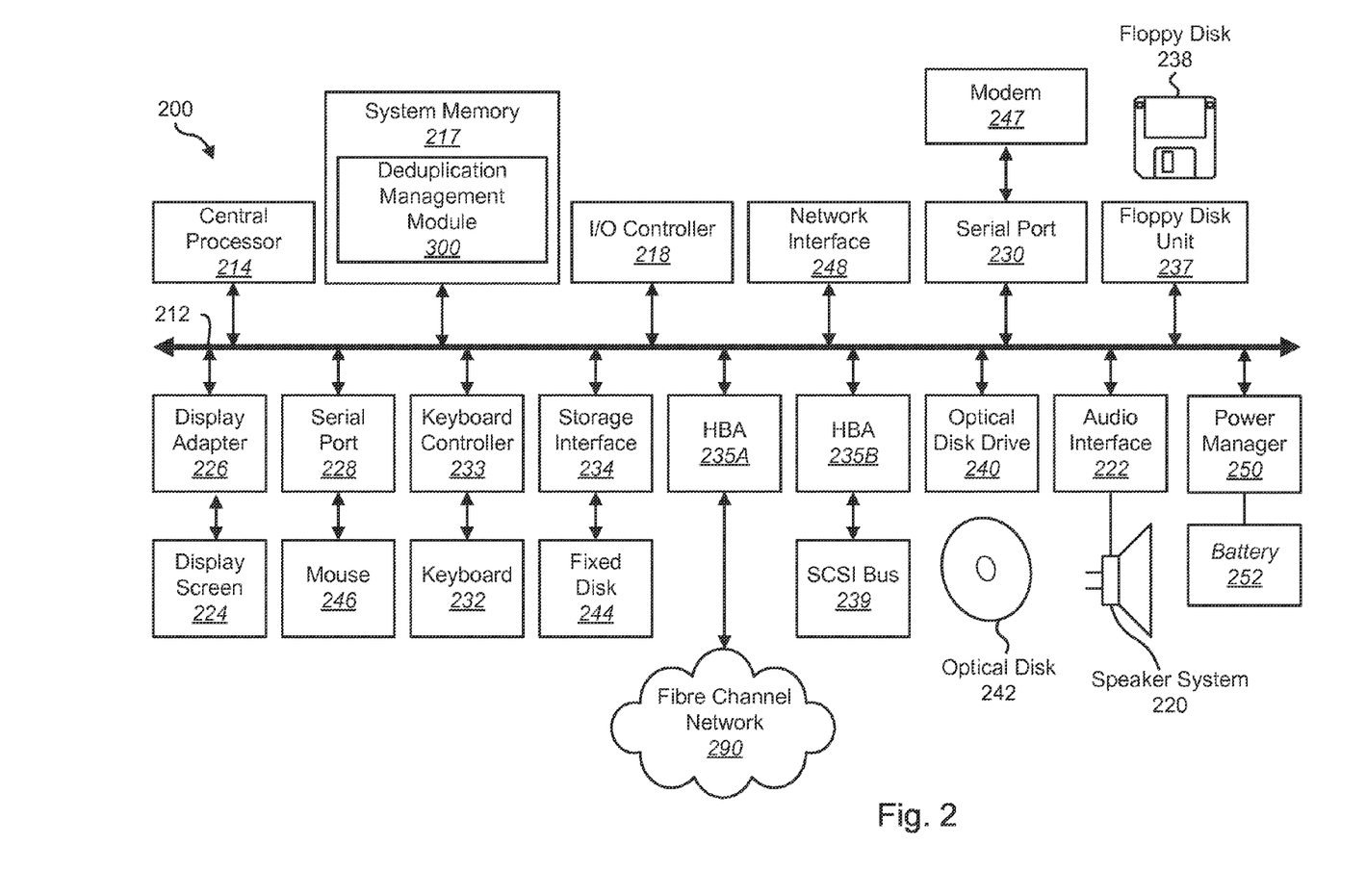
FIG. 2 shows a block diagram depicting a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may access information on server 140A-140N using, for example, a web browser or other client software (not shown). Such a client may allow client systems 110, 120 and 130 to access data hosted by any one of servers 140A-140N or one of storage devices 160A(1)-(N), 160N(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160N(1)-(N), and/or 180(1)-(N) may be network accessible storage and may be local, remote, or a combination thereof to any one of servers 140A-140N. Storage devices 160A(1)-(N), 160N(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160N(1)-(N), and/or 180(1)-(N) may be used for backup or archival purposes. For example, storage devices 160N(1)-(N) and/or 180(1)-(N) may be used to store data replicated from storage devices 160A(1)-(N).

According to some embodiments, clients 110, 120, and 130 may be smartphones, PDAs, desktop computers, laptop computers, servers, other computers or computing devices, or other devices coupled via a wireless or wired connection to network 150. Clients 110, 120, and 130 may receive data from user input, a database, a file, a web service, and/or an application programming interface.

Servers 140A-140N may be application servers, archival platforms, backup servers, network storage devices, media servers, email servers, document management platforms, enterprise search servers, or other devices communicatively coupled to network 150. Servers 140A-140N may utilize one of storage devices 160A(1)-(N), 160N(1)-(N), and/or 180(1)-(N) for the storage of application data, backup data, or other data. Servers 140A-140N may be hosts, such as an application server, which may process data traveling between clients 110, 120, and 130 and a backup platform, a backup process, and/or storage. According to some embodiments, servers 140A-140N may be platforms used for backing up and/or archiving data. One or more portions of data may be backed up or archived based on a backup policy and/or an archive applied, attributes associated with the data source, space available for backup, space available at the data source, or other factors. Further, each server 140A-140N, client 110-130, or device 160A-160N, 180A-180N, may function as a node within a clustered computing environment. the nodes may provide storage for data backup and deduplication according to NetBackup 5400 from Symantec Corp.

According to some embodiments, server 140A may contain one or more portions of software for deduplication management such as, for example, deduplication management module 300. As illustrated, one or more portions of the virtual machine management module 300 may reside at a network centric location. For example, server 140A may be a server, a firewall, a gateway, or other network element that may perform one or more actions to manage virtual machines. According to some embodiments, network 190 may be an external network (e.g., the Internet) and server 140A may be a gateway or firewall between one or more internal components and clients and the external network. According to some embodiments, deduplication module 300 may be implemented as part of a cloud computing environment.

FIG. 2 shows a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, a removable disk unit (e.g., Universal Serial Bus drive), or other storage medium. According to some embodiments, deduplication management module 300 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

The description below describes network elements, computers, and/or components of a system and method for disaster recovery that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Figure 3:
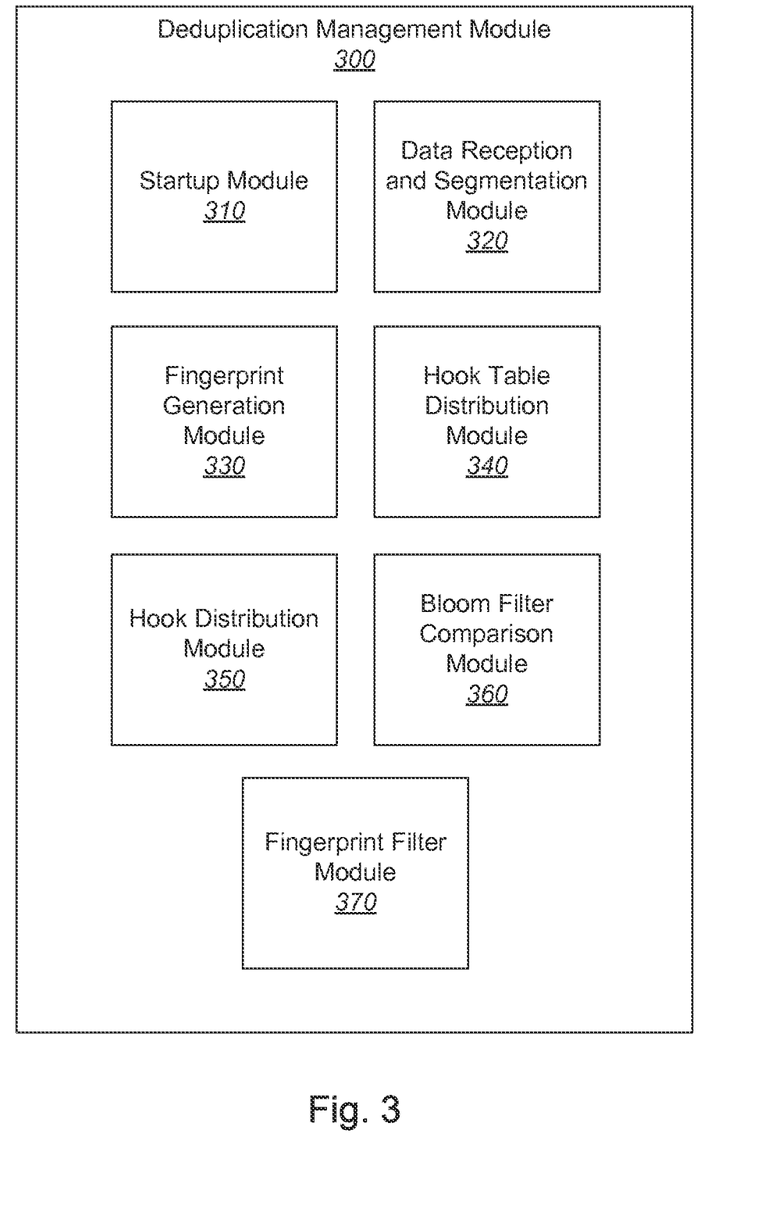
FIG. 3 shows a deduplication management module in accordance with an embodiment of the present disclosure.

FIG. 3 shows a deduplication management module 300 in accordance with an embodiment of the present disclosure. As illustrated, the deduplication management module 300 may contain one or more components including a startup module 310, a data reception and segmentation module 320, a fingerprint generation module 330, a hook table distribution module 340, a hook distribution module 350, a bloom filter comparison module 360, and a fingerprint filter module 370. The deduplication management module 300 may manage the backup of data to limit the number of redundant copies of files or redundant segments of files using deduplication.

The startup module 310 may, upon startup, calculate a global unique identifier (GUID) for each node and determine a range of hook table indexes for each node within the multi-node clustered environment. In addition, each node may read from a common state file stored in a common location and populate the locally stored hook table.

The data reception and segmentation module 320 may receive data and separate the data into segments. In some embodiments, the segments may be of a predetermined length based on characteristics of the deduplication and backup system. The segmented data may then be stored. In addition, the data reception and segmentation module 320 may receive fingerprints in a lookup set for use in a lookup operation.

The fingerprint generation module 330 may generate a fingerprint for each of the data segments created by the data reception and segmentation module 320. In some embodiments, the fingerprints are generated as a hash key and stored in an in-memory batch buffer. The in-memory batch buffer may be arranged at any one of a plurality of computing nodes. In another embodiment, the in-memory batch buffer may be arranged at a main node. Further, the fingerprint generation module 330 may also add a corresponding entry to a bloom filter stored at the main node with the in-memory buffer.

The hook table distribution module 340 may determine if the in-memory buffer is full and that the fingerprints stored in the in-memory buffer are to be moved to a disk in a batch. The batches may be of a predetermined size, for example, 256 KB or approximately five thousand fingerprints per batch. In some embodiments, the hook table distribution module 340 may take a sample of the fingerprints in the in-memory buffer for addition to a hook table.

Further, the hook table distribution module 340 may utilize the first n-bits of the fingerprints to index the fingerprints into a plurality of hook tables located at different nodes in a multi-node clustered system, a multi-core system, or a single node multi-core system. In the multi-core system, the hook table may be distributed across different cores. The hook table distribution module 340 may determine how many n-bits of the fingerprints to utilize based on a size of the hook tables. In some embodiments, the hook table distribution module 340 may determine how many n-bits of the fingerprints to utilize at startup. For example, the hook table distribution module 340 may determine that the size of the hook table is 1 GB and the first 28 bits of the fingerprints may be used to index into the hook table to provide 128 M hook table entries. Additionally, in some embodiments, fingerprint batches may be linked with a previous batch while storing on disk. The fingerprint batches may be linked when there is an entry in the hook table and based on a sample rate, the next n entries are to be added in batches.

Additionally, the hook table distribution module 340 may index the fingerprints to the nodes such that no two nodes have a hook table with a same index and the hook tables distributed to the different nodes may appear to be a single hook table when viewed together. For example, for 128 M entries in a four node cluster, the first 28 bits of the fingerprints may be used such that a first node may store a first hook table with an index from 0 to 32 M−1, a second node may store a second hook table with an index from 32 M to 64 M−1, a third node may store a third hook table with an index from 64 M to 96 M−1, and a fourth node may store a fourth hook table with an index from 96 M to 128 M−1.

The hook table distribution module 340 may also determine how to distribute the fingerprints in the in-memory buffer into a plurality of hook tables located at different nodes in a multi-node clustered system or multi-core system. In some embodiments, the hook table distribution module 340 may determine the distribution of the fingerprints across the nodes based on the number of computing nodes in the cluster, a target deduplication system capacity, a sampling rate, and an in-memory hook table size per node.

In addition, the hook table distribution module 340 may, upon receipt of a lookup request, identify all of the hooks for the received fingerprints in a lookup set. In some embodiments, the hook table distribution module 340 may use the first n-bits of the fingerprints to index into the hook tables. Further, the hook table distribution module 340 may determine which node the fingerprints are to be sent to check for entries in the respective hook table. At each node, the received first n-bits may be compared to the locally stored hook table to determine if there is a match. After the comparison at the nodes, each node may provide a batch number, or a list of batch numbers, where the match occurred and the number of matches that occur to the main node.

In some embodiments, the hook table distribution module 340 may also redistribute the hook table entries into available nodes when a new node joins the cluster or an existing node leaves the cluster or goes offline. Also, a user may designate only a subset of nodes in a clustered node system to be used to have a distributed hook table entries.

The bloom filter comparison module 360 may check a bloom filter at the main node upon receipt of the batch numbers and the number of matches from each of the nodes. In addition, the bloom filter comparison module 360 may identify what fingerprints do not exist based on the check of the bloom filter.

The fingerprint filter module 370 may filter the fingerprints that are determined not to exist and transmit the remaining fingerprints to a first node with the highest number of matches. The first node may compare the received fingerprints to determine which fingerprints exist at the first node and return a response to the main node. After receiving a response from the first node, the fingerprint filter module 370 may filter the remaining fingerprints and send the filtered fingerprints to the second node with the second highest number of matches. The second node may compare the received filtered fingerprints to determine which exist at the second node and return a response to the main node. After sending the initial or filtered fingerprints to the node with highest number of matches, the second node may compare fingerprints with the fingerprints added in the marked batch (batches having at least one fingerprint in the given lookup set identified during lookup performed at each node) or may compare with all the linked batches with the marked batches. The process may be repeated for each of the nodes having at least one match.

After each of the nodes has returned a response, the deduplication management module 300 may determine which of the fingerprints are new such that the associated data may be backed up to the appropriate storage device and which fingerprints are not new such that the associated data is not redundantly stored.

Figure 4:
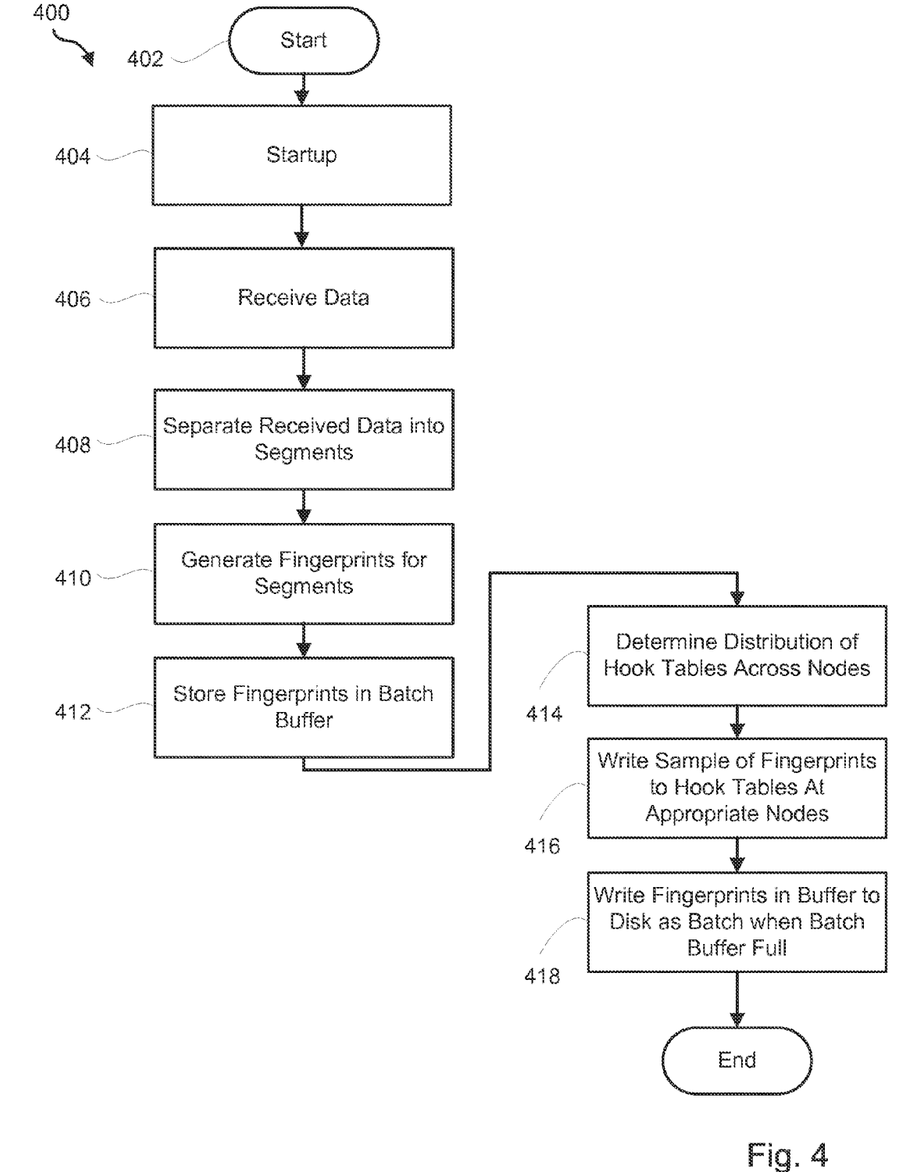
FIG. 4 shows a method for inserting fingerprints in accordance with an embodiment of the present disclosure.

FIG. 4 shows a method 400 for method for inserting fingerprints in accordance with an embodiment of the present disclosure. The method 400 may be performed automatically without user input and may be performed periodically. In addition, the method 400 may be performed across multiple nodes within a clustered computing environment that includes clients and servers. At block 402, the method 400 may begin.

At block 404, startup processes may be performed. In some embodiments, the startup module 310 may perform the startup processes. During startup, a global unique identifier (GUID) for each node and a range of hook table indexes for each node within the multi-node clustered environment may be determined. In addition each node may read a state file that is stored at a common location (i.e., a main node) and populate the locally stored hook table. The process may then proceed to block 406.

At block 406, data may be received to be backed up. In some embodiments, the data reception and segmentation module 320 may receive the data to be backed up. The data may be any type of appropriate data that an administrator or user wishes to backup. Further, the data may be received at any node within the clustered computing environment. For example, the data may be received at a client or a server within the clustered environment. The process may then proceed to block 408.

At block 408, the data received may be segmented. The data segmentation may be performed by the data reception and segmentation module 320. In some embodiments, the data is segmented into predetermined lengths that are to be stored as backup data when it is determined that the received data is not already backed up or already exists. The process may then proceed to block 410.

At block 410, fingerprints for each of the data segments may be generated. In some embodiments, the fingerprints may be generated by the fingerprint generation module 330. The fingerprints may be generated as a hash key and stored in an in-memory buffer. In addition, the in-memory buffer may be arranged at a main node. The process may then proceed to block 412.

At block 412, the fingerprints generated at block 410 may be stored in an in-memory batch buffer. In some embodiments, the fingerprints may be stored in the in-memory batch buffer by the fingerprint generation module 330. The fingerprints may be stored in the in-memory batch buffer in order of generation based on the order in which the data was received. The batch buffer may have a predetermined size and hold a predetermined number of fingerprints. For example, the buffer may have a size of 256 KB and hold approximately five thousand fingerprints. After storing the generated fingerprints in the in-memory batch buffer, the process may proceed to block 414.

At block 414, it may be determined whether the in-memory batch buffer is full and that the fingerprints stored in the in-memory batch buffer are to be moved to a disk. Once moved to the disk, the fingerprints may be maintained on the disk. In some embodiments, the determination of whether the in-memory batch buffer is full of fingerprints may be performed by the hook table distribution module 340. When it is determined that the in-memory batch buffer is full, the hook table distribution module 340 may move the fingerprints currently stored in the batch buffer to a disk for permanent storage. The fingerprints may be stored to a disk arranged at any one of a plurality of the nodes in the clustered computing environment. In some embodiments, the fingerprints may be distributed across disks at each of the plurality of the nodes in the clustered computing environment.

In addition, at block 414, a sample of on-disk fingerprints may be selected and added to a plurality of hook tables stored at each of a plurality of nodes within the clustered computing environment. In some embodiments, the processes of block 414 may be performed by the hook table distribution module 340. The sample of the fingerprints may be the first n-bits of the fingerprints. In some embodiments, the number of bits, n, is based on a size of the hook table. In addition, the sampling may be based on a target deduplication capacity. For example, to support eight petabytes of deduplication capacity, a hook table in-memory size would be 32 GB and that sampling may be done by selecting 1 in 128 fingerprints. Further, the sample of the fingerprints may be based on a flag within the fingerprints. In addition, the sample of the fingerprints, now called hooks, may be written to the in-memory batch buffer.

Further, at block 414, a distribution of the hook table entries across hook tables in a clustered environment may be determined. In some embodiments, the distribution of the hook table entries may be determined by the hook table distribution module 340. The distribution may be based on a plurality of factors. In some embodiments, the distribution of the hook table entries may be based on a determination of how many nodes exist within the clustered computing environment, the deduplication capacity or storage capacity within the clustered environment, the sampling rate of the fingerprints, and the size of the in-memory hook table at each of the nodes. The process may then proceed to block 416.

At block 416, the sample of fingerprints, the hooks, may be distributed and written to the hook table at each node based on the distribution determined at block 414. In some embodiments, the distribution of the hook table entries may be performed by the hook distribution module 350. The hooks may be distributed to each of the nodes sequentially or concurrently via the appropriate paths. After the hooks have been distributed to the nodes and stored in the respective hook tables, the process may proceed to block 418.

At block 418, the entire in-memory batch buffer is written to the appropriate disk. In some embodiments, the writing of the entire in-memory batch buffer may also be performed by the hook distribution module 350. By utilizing multiple hook tables across multiple nodes, the overall storage capacity may be increased and the sampling rate may also be increased to achieve a higher performance, a higher deduplication rate, and a higher deduplication capacity.

Figure 5:
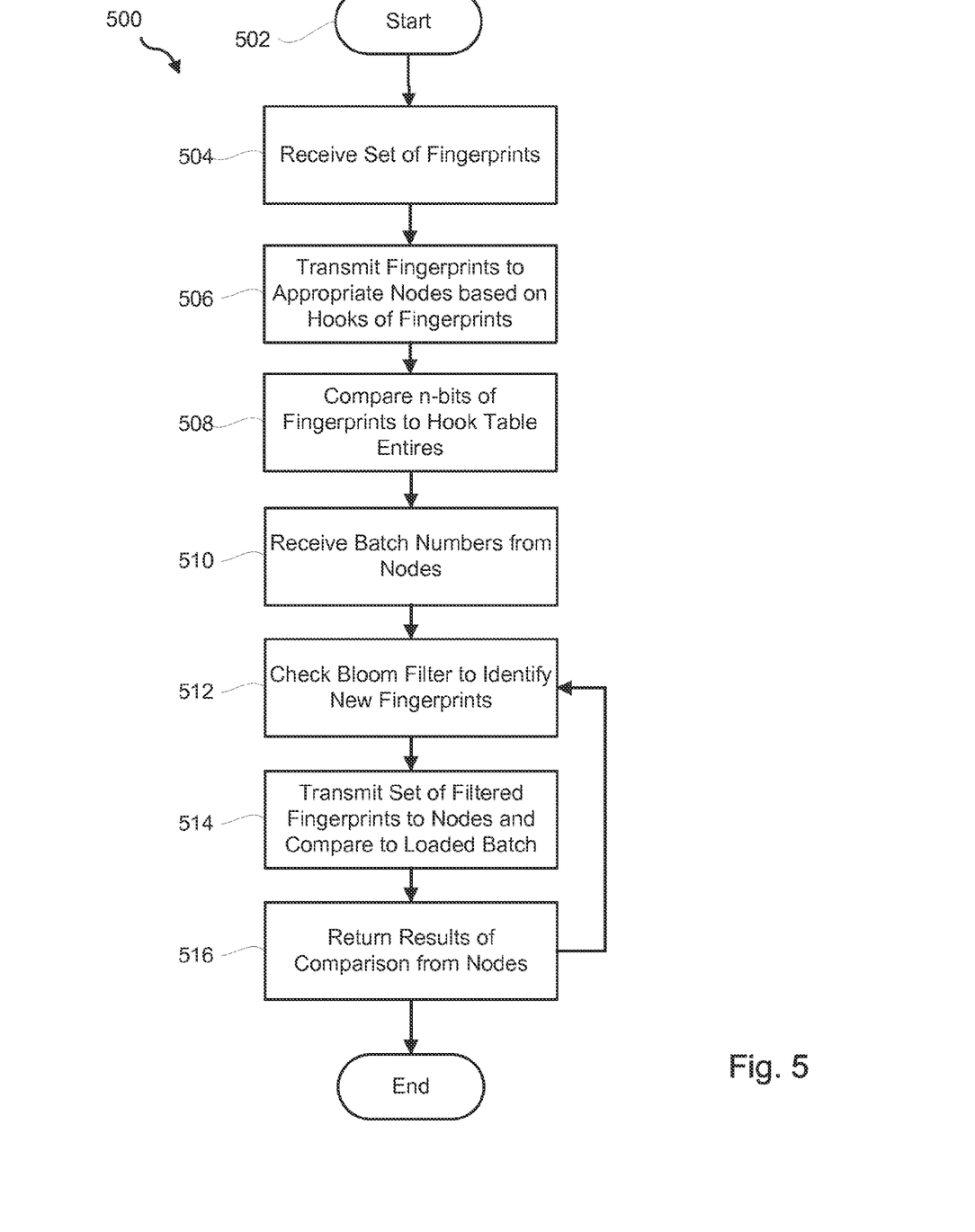
FIG. 5 shows a method for looking up fingerprints in accordance with an embodiment of the present disclosure.

FIG. 5 shows a method 500 for looking up fingerprints in accordance with an embodiment of the present disclosure. At block 502, the method 500 may begin.

At block 504, a lookup set of fingerprints may be received. In some embodiments, the lookup set of fingerprints may be received by the data reception and segmentation module 320. Upon receipt of the lookup set of fingerprints, the first n bits of the fingerprints may be extracted as hooks. The process may then proceed to block 506.

At block 506, it may be determined which node to transmit the hooks for each of the received fingerprints to. In some embodiments, the determination of which node to transmit the hooks for the received fingerprints to may be performed by the hook distribution module 350. The determination of the appropriate node for each hook may be based on the first n bits of each fingerprint. After the appropriate node has been determined, the hooks of the received fingerprints may be transmitted to the nodes for comparison to the hook table entries as well as batch file number at the appropriate nodes. The process may then proceed to block 508.

At block 508, the node that receives the hooks, the first n-bits of the received fingerprints, compares the hooks to the hook table entries in the locally stored hook table to determine if there is a match. If there is a match, a batch number corresponding to that entry is treated as a hook. If there are multiple matches, each of the batch numbers in that entry are treated as a hook and a unique list of batch numbers is generated. After the comparison, the node may provide the batch number, or the list of batch numbers, to the main node. The process may then proceed to block 510.

At block 510, the main node may receive the batch number or list of batch numbers based on the comparison of the hooks for the received fingerprints to the hook table entries from each node. The process may then proceed to block 512.

At block 512, the main node may check a bloom filter. In some embodiments, the checking of the bloom filter may be performed by the bloom filter comparison module 360. The bloom filter may be maintained at each batch file level and updated when a new fingerprint is added to the batch file. Upon receipt of the batch number or list of batch numbers from the nodes, it may be determined which fingerprints do not exist based on the check of the bloom filter. The process may then proceed to block 514.

At block 514, the fingerprints that were determined not to exist are filtered and the remaining fingerprints are transmitted to the node having the highest number of matches. In some embodiments, the fingerprints may be filtered by the fingerprint filter module 370. Upon receipt of the transmitted fingerprints from the main node at the first node having the highest number of matches, the first node may load the corresponding on-disk batch to a lookup batch buffer. Additionally, the first node may compare the fingerprints received from the main node to the fingerprints stored in the lookup batch buffer to determine if there is a match. Based on the comparison, the first node may return a result to the main node identifying which fingerprints exist. The process may then proceed to block 516.

At block 516, the main node may receive the results of the comparison from the first node. In some embodiments, the data reception and segmentation module 320 may receive the results from the first node. Upon receipt of the results from the first node, the process may return to block 512 where the fingerprints may again be compared to the bloom filter. In addition, after comparison to the bloom filter, the fingerprints may again be filtered to remove the fingerprints existing at the first node at block 514. The further filtered fingerprints may then be transmitted to a second node having the second highest number of matches at block 514. The second node may compare the received filtered fingerprints to determine which exist at the second node and return a response to the main node at block 516. The process may be repeated for each of the nodes having at least one match.

After each of the nodes has returned a response, the deduplication management module 300 may determine which of the fingerprints are new such that the associated data segments may be backed up to the appropriate storage device and which fingerprints are not new such that the associated data segments are not redundantly stored.

At this point it should be noted that data deduplication management in accordance with the present disclosure as described above may involve the processing of input data and the generation of output data to some extent. This input data processing and output data generation may be implemented in hardware or software. For example, specific electronic components may be employed in a data deduplication management or similar or related circuitry for implementing the functions associated with data deduplication management in accordance with the present disclosure as described above. Alternatively, one or more processors operating in accordance with instructions may implement the functions associated with data deduplication management in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for managing deduplication of data comprising:
    receiving, via a network, first data to be backed up;
    separating the first data to be backed up into segments;
    generating, using at least one computer processor, a fingerprint for each of the segments;
    sampling n-bits of the fingerprints;
    writing the sampled fingerprints to a plurality of hook tables arranged in a plurality of computing nodes, wherein the plurality of computing nodes respectively contain at least one of the plurality of hook tables, and wherein sizes of the n-bits of each of the sampled fingerprints are based on sizes of the hook tables to which the sampled fingerprints are written;
    receiving a lookup set of fingerprints corresponding to second data to be backed up;
    extracting a portion of the fingerprints corresponding to the second data;
    comparing the extracted portion of the fingerprints corresponding to the second data to entries of the plurality of hook tables to determine which of the plurality of hook tables has a highest number of matches;
    determining whether any of the fingerprints corresponding to the second data do not exist in memory based on the comparison using the respective extracted portions;
    filtering the fingerprints corresponding to the second data that are determined not to exist and transmitting remaining fingerprints corresponding to the second data to the computing node having the hook table with the highest number of matches so that a second comparison is made using the remaining fingerprints to determine which of the remaining fingerprints exist in the fingerprints generated from the first data; and
    backing up segments associated with the second data that do not exist in the first data.

2. The method for managing deduplication of data of claim 1, further comprising:
    storing the generated fingerprints in a buffer.

3. The method for managing deduplication of data of claim 2, further comprising:
    determining whether the buffer is full; and
    writing the fingerprints in the buffer to the memory when it is determined that the buffer is full.

4. The method for managing deduplication of data of claim 2, further comprising:
    performing the sampling using the fingerprints stored in the buffer.

5. The method for managing deduplication of data of claim 4, wherein each sampled fingerprint is a hook.

6. The method for managing deduplication of data of claim 4, wherein the fingerprints are sampled at a predetermined rate.

7. The method for managing deduplication of data of claim 6, wherein the predetermined rate is selected based on a size of the at least one of the plurality of hook tables.

8. The method for managing deduplication of data of claim 4, further comprising:
    determining which of the fingerprints to distribute to each of the plurality of hook tables.

9. The method for managing deduplication of data of claim 8, wherein each of the plurality of hook tables is arranged at a separate computing node within a clustered environment.

10. The method for managing deduplication of data of claim 9, wherein determining the distribution of the fingerprints to each of the plurality of hook tables is based on a number of the separate computing nodes.

11. The method for managing deduplication of data of claim 8, wherein determining the distribution of the fingerprints to each of the plurality of hook tables is based on a target deduplication capacity.

12. The method for managing deduplication of data of claim 8, wherein determining the distribution of the fingerprints to each of the plurality of hook tables is based on a rate at which the fingerprints are sampled.

13. The method for managing deduplication of data of claim 8, wherein determining the distribution of the fingerprints to each of the plurality of hook tables is based on a size of each of the plurality of hook tables.

14. The method for managing deduplication of data of claim 1, wherein each of the plurality of hook tables are arranged at different computing nodes and the received lookup set of fingerprints is compared to the entries of the hook table at each computing node sequentially.

15. An article of manufacture for managing deduplication of data, the article of manufacture comprising:
  at least one non-transitory processor readable storage medium; and instructions stored on the at least one medium;
    wherein the instructions are configured to be readable from the at least one medium by at least one processor and thereby cause the at least one processor to operate so as to: receive first data to be backed up;
    separate the first data to be backed up into segments;
    generate a fingerprint for each of the segments;
    sample n-bits of the fingerprints;
    write the sampled fingerprints to a plurality of hook tables arranged in a plurality of computing nodes, wherein the plurality of computing nodes respectively contain at least one of the plurality of hook tables, and wherein sizes of the n-bits of each of the sampled fingerprints are based on sizes of the hook tables to which the sampled fingerprints are written;
    receive a lookup set of fingerprints corresponding to second data to be backed up;
    extract a portion of the fingerprints corresponding to the second data; compare the extracted portion of the fingerprints corresponding to the second data to entries of the plurality of hook tables to determine which of the plurality of hook tables has a highest number of matches;
    determine whether any of the fingerprints corresponding to the second data do not exist in memory based on the comparison using the respective extracted portions;
    filter the fingerprints corresponding to the second data that are determined not to exist and transmit remaining fingerprints corresponding to the second data to the computing node having the hook table with the highest number of matches so that a second comparison is made using the remaining fingerprints to determine which of the remaining fingerprints exist in the fingerprints generated from the first data; and
    back up the segments associated with the second data that do not exist in the first data.

16. A system for managing deduplication of data comprising:
  one or more processors communicatively coupled to a network; wherein the one or more processors are configured to:
    receive first data to be backed up;
    separate the first data to be backed up into segments;
    generate a fingerprint for each of the segments;
    sample n-bits of the fingerprints;
    write the sampled fingerprints to a plurality of hook tables arranged in a plurality of computing nodes, wherein the plurality of computing nodes respectively contain at least one of the plurality of hook tables, and wherein sizes of the n-bits of each of the sampled fingerprints are based on sizes of the hook tables to which the sampled fingerprints are written;
    receive a lookup set of fingerprints corresponding to second data to be backed up;
    extract a portion of the fingerprints corresponding to the second data;
    compare the extracted portion of the fingerprints corresponding to the second data to entries of the plurality of hook tables to determine which of the plurality of hook tables has a highest number of matches;
    determine whether any of the fingerprints corresponding to the second data do not exist in memory based on the comparison using the respective extracted portions;
    filter the fingerprints corresponding to the second data that are determined not to exist and transmit remaining fingerprints corresponding to the second data to the computing node having the hook table with the highest number of matches so that a second comparison is made using the remaining fingerprints to determine which of the remaining fingerprints exist in the fingerprints generated from the first data; and
    back up segments associated with the second data that do not exist in the first data.

17. A system for managing deduplication of data, the system comprising:
  at least one processor configured to:
    receive first data to be backed up;
    separate the first data to be backed up into segments;
    generate a fingerprint for each of the segments;
    sample n-bits of the fingerprints;
    write the sampled fingerprints to a plurality of hook tables arranged in a plurality of computing nodes, wherein the plurality of computing nodes respectively contain at least one of the plurality of hook tables, and wherein sizes of the n-bits of each of the sampled fingerprints are based on sizes of the hook tables to which the sampled fingerprints are written;
    receive a lookup set of fingerprints corresponding to second data to be backed up;
    extract a portion of the fingerprints corresponding to the second data;
    compare the extracted portion of the fingerprints corresponding to the second data to entries of the plurality of hook tables to determine which of the plurality of hook tables has a highest number of matches;
    determine whether any of the fingerprints corresponding to the second data do not exist in memory based on the comparison using the respective extracted portions;
    filter the fingerprints corresponding to the second data that are determined not to exist and transmit remaining fingerprints corresponding to the second data to the computing node having the hook table with the highest number of matches so that a second comparison is made using the remaining fingerprints to determine which of the remaining fingerprints exist in the fingerprints generated from the first data; and back up segments associated with the second data that do not exist in the first data; and at least one memory, coupled to the at least one processor, configured to provide the at least one processor with instructions.

\* \* \* \* \*